(12) United States Patent
Alangari

(10) Patent No.: US 10,959,809 B1
(45) Date of Patent: Mar. 30, 2021

(54) MULTIFUNCTIONAL DENTAL LINER APPLICATOR

(71) Applicant: KING SAUD UNIVERSITY, Riyadh (SA)

(72) Inventor: Sarah Sultan Alangari, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 16/783,426

(22) Filed: Feb. 6, 2020

(51) Int. Cl.
*A61C 5/70* (2017.01)
*A61C 19/04* (2006.01)
*A61C 17/022* (2006.01)
*A61C 1/08* (2006.01)
*A61C 17/02* (2006.01)

(52) U.S. Cl.
CPC ............. *A61C 5/70* (2017.02); *A61C 1/088* (2013.01); *A61C 17/022* (2013.01); *A61C 17/0202* (2013.01); *A61C 19/043* (2013.01); *A61C 2204/002* (2013.01)

(58) Field of Classification Search
CPC ..... A61C 5/70; A61C 19/043; A61C 17/0202; A61C 17/022; A61C 1/088; A61C 2204/002
USPC ............................................................ 433/82
See application file for complete search history.

(56) References Cited

U.S. PATENT DOCUMENTS

| | | | |
|---|---|---|---|
| 2,812,765 A * | 11/1957 | Tofflemire | A61M 1/0064 604/32 |
| 3,807,048 A | 4/1974 | Malmin | |
| 3,816,921 A | 6/1974 | Malmin | |
| 4,217,101 A | 8/1980 | Loge | |
| 4,472,141 A | 9/1984 | Dragan | |
| 4,648,840 A | 3/1987 | Conger, Sr. | |
| 4,820,152 A | 4/1989 | Warrin et al. | |
| 4,872,837 A * | 10/1989 | Issalene | A61C 1/088 433/29 |
| 5,658,144 A * | 8/1997 | Tinder | A61C 17/02 433/80 |
| 5,899,692 A | 5/1999 | Davis et al. | |
| 5,927,975 A * | 7/1999 | Esrock | A61C 1/18 285/133.11 |
| 6,305,934 B1 * | 10/2001 | Hatley, Jr. | A61C 17/0202 433/80 |
| 6,689,078 B1 * | 2/2004 | Rehkemper | A61C 17/30 15/29 |
| 7,766,656 B1 | 8/2010 | Feine | |
| 7,857,621 B2 | 12/2010 | Teufelberger et al. | |
| 9,173,726 B2 | 11/2015 | Sabourin | |
| 9,883,931 B2 | 2/2018 | Gente et al. | |

(Continued)

*Primary Examiner* — Matthew M Nelson
(74) *Attorney, Agent, or Firm* — Nath, Goldberg & Meyer; Richard C. Litman

(57) ABSTRACT

A multifunctional dental liner applicator dispenses tooth liner and a stream of air while illuminating the working dental area. The applicator includes a body and a head that is removably attached to a distal end of the body. The head supports a nozzle that is configured to be inserted into a void of a prepared tooth. A liner button on the body controls a valve for dispensing liner out of the nozzle. An air button controls airflow out of openings adjacent the nozzle for drying an area that is receiving liner. Fiber optic fibers extend from a button controlled light source housed in the body to openings adjacent the nozzle for illuminating the working area.

10 Claims, 14 Drawing Sheets

(56) References Cited

U.S. PATENT DOCUMENTS

| | | | |
|---|---|---|---|
| 2005/0048436 A1 | 3/2005 | Fishman et al. | |
| 2010/0273126 A1* | 10/2010 | Janssen | A61C 17/0202 |
| | | | 433/89 |
| 2015/0265385 A1* | 9/2015 | Klecker | A61C 17/0217 |
| | | | 433/90 |
| 2019/0110875 A1* | 4/2019 | Ochs | A61C 17/0202 |

* cited by examiner

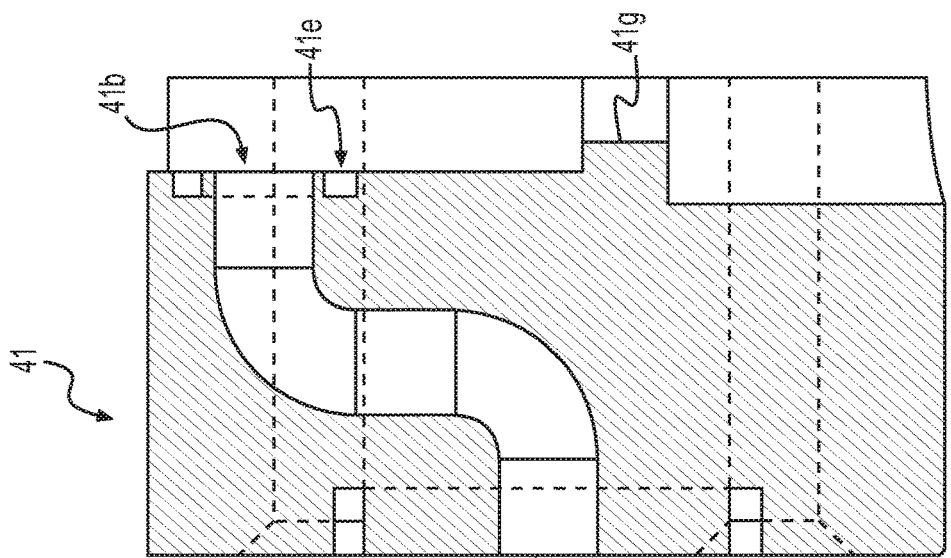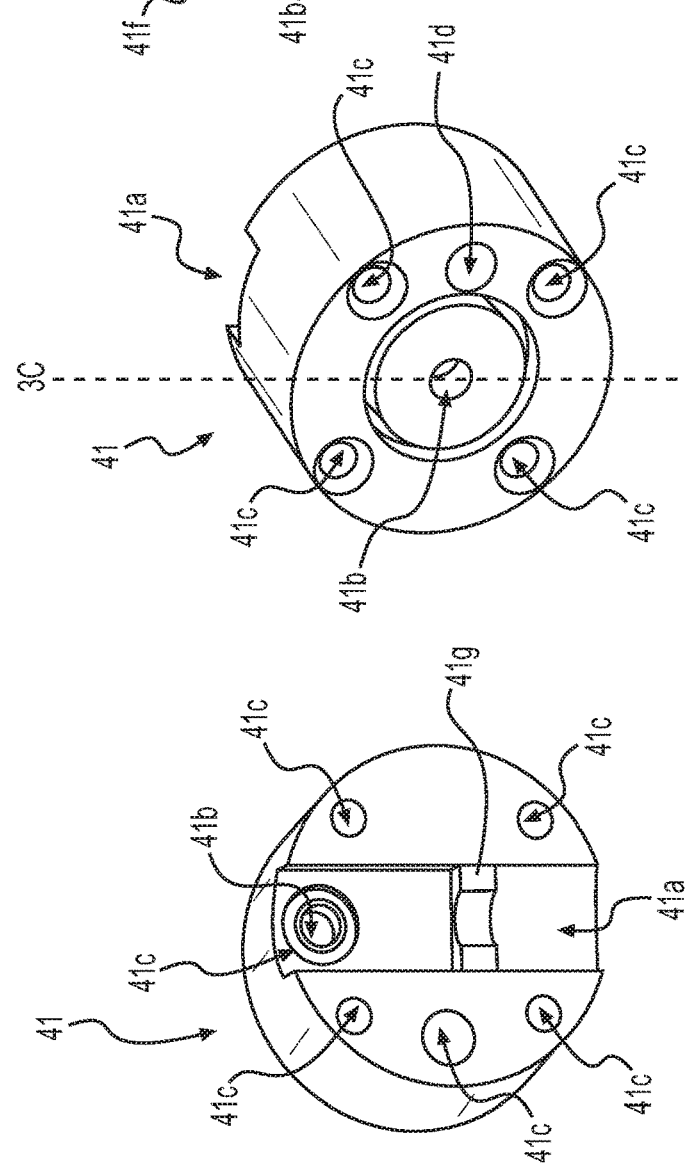

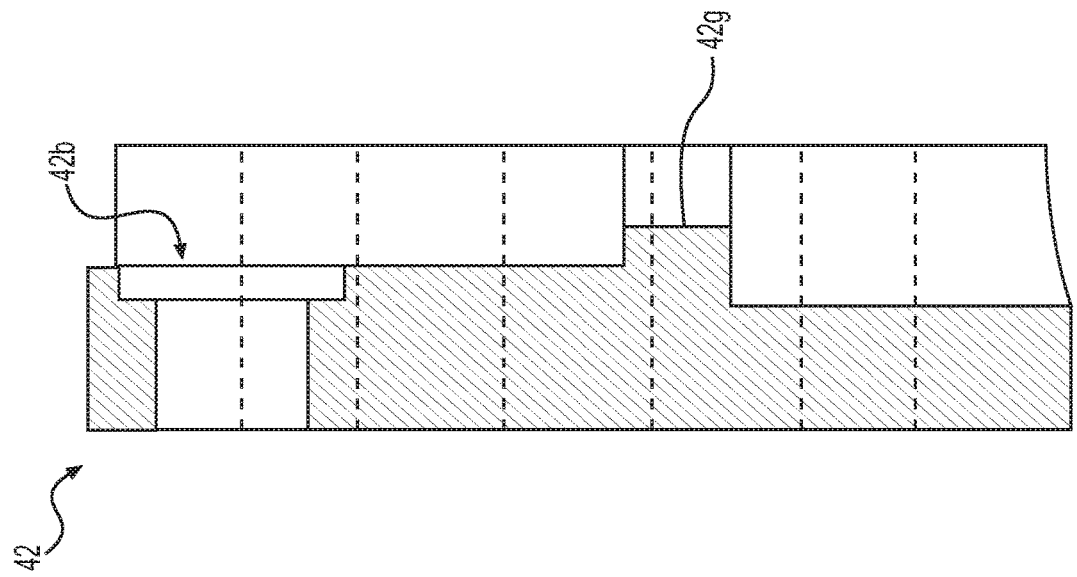
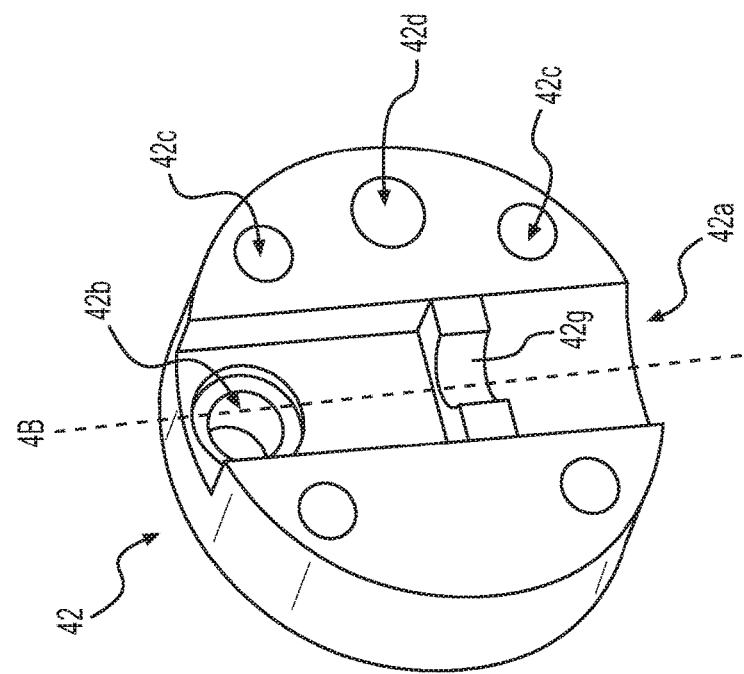

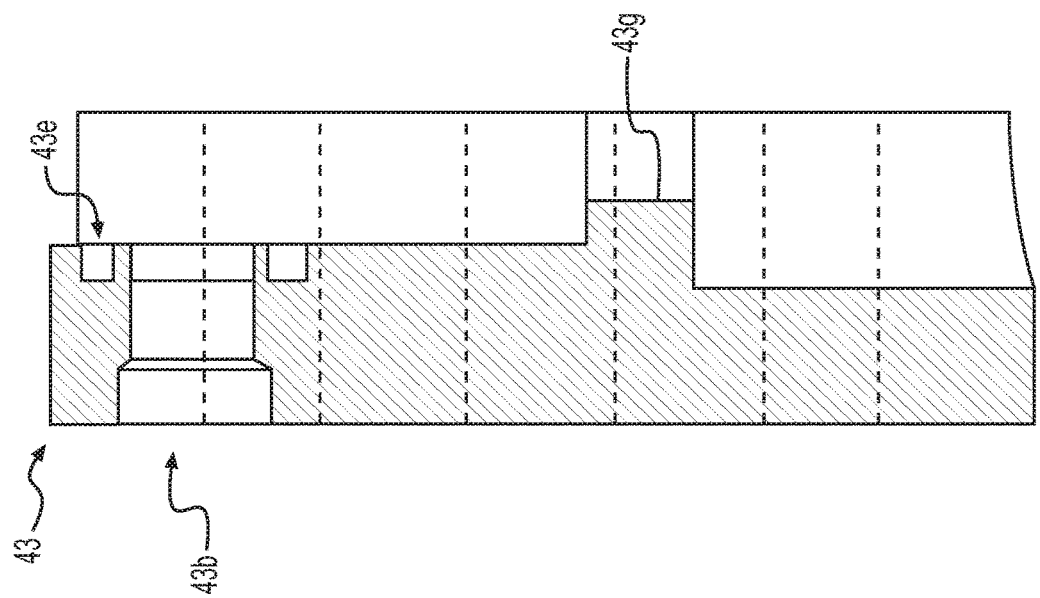
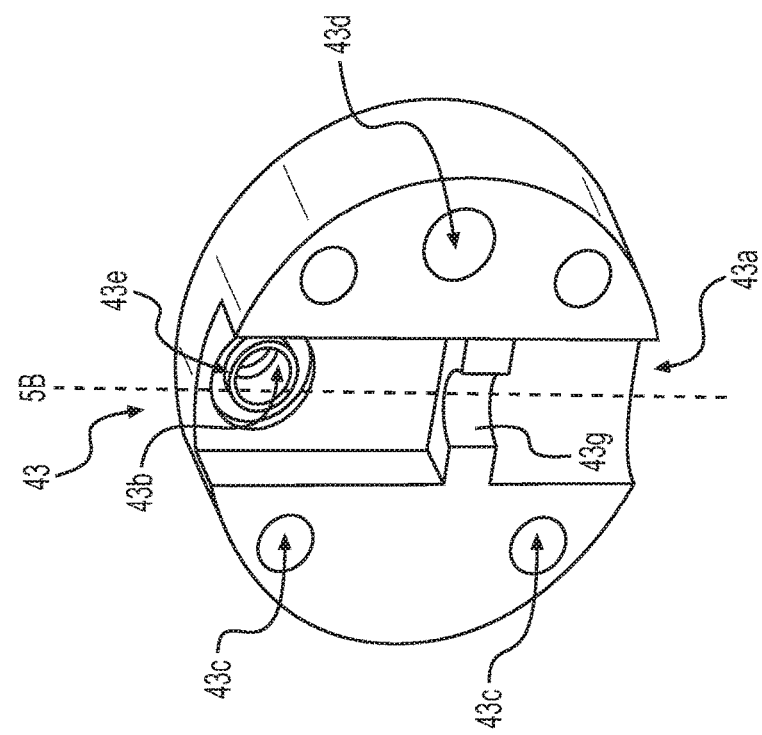

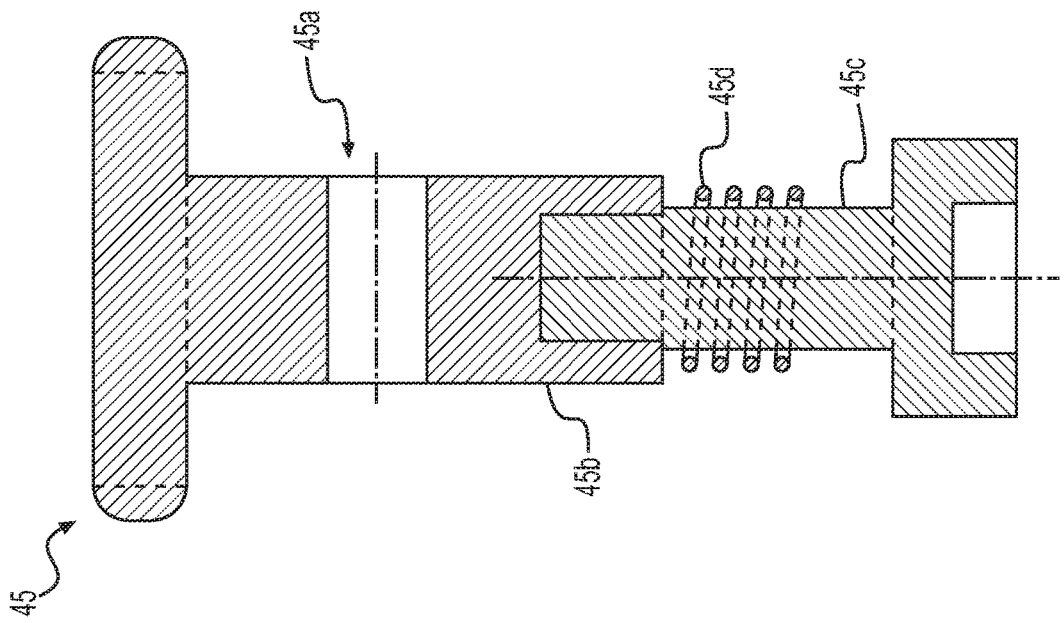
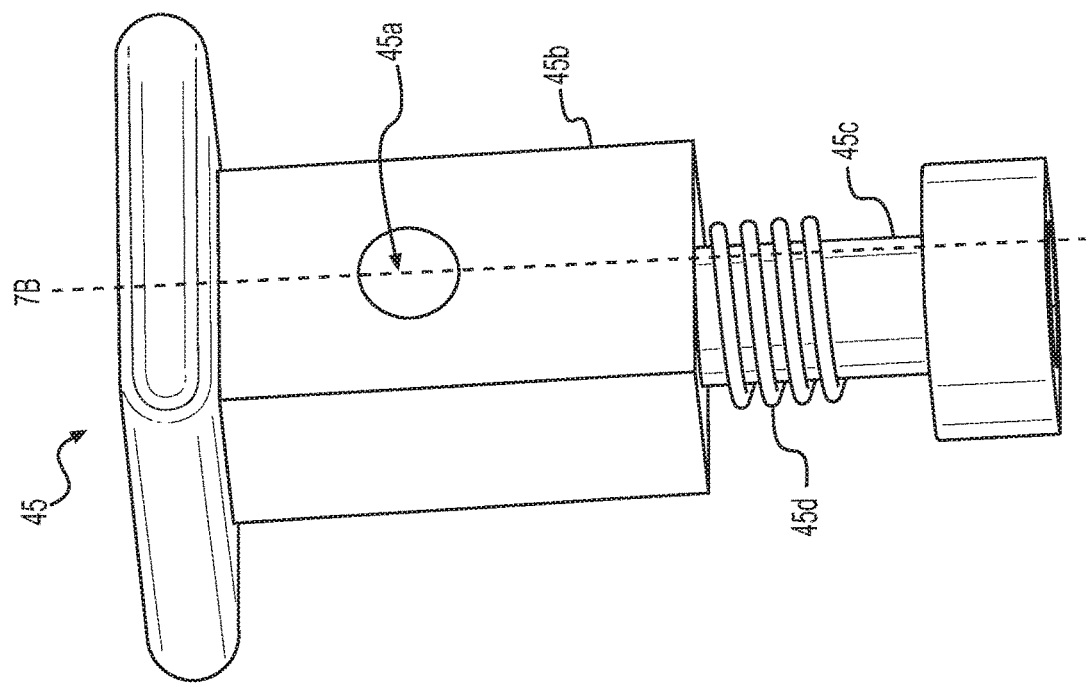

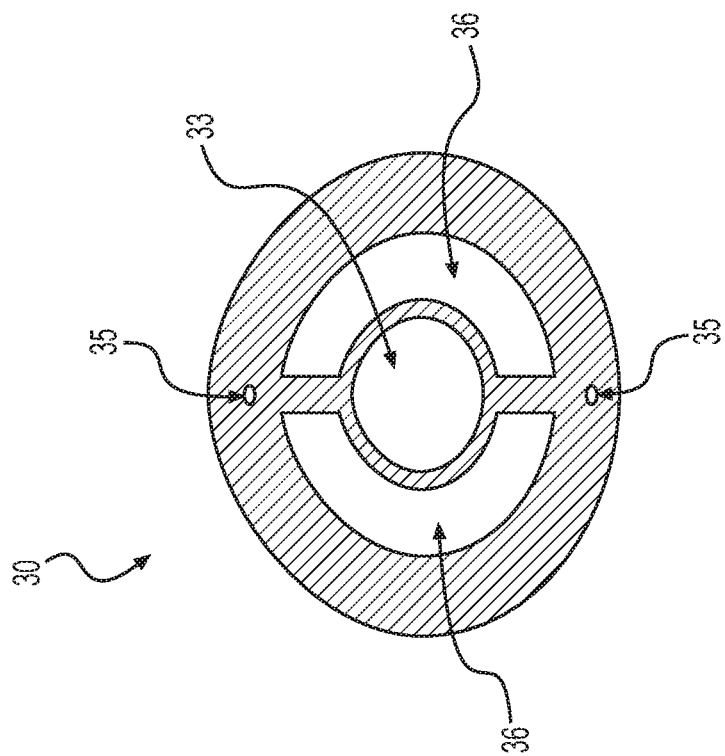
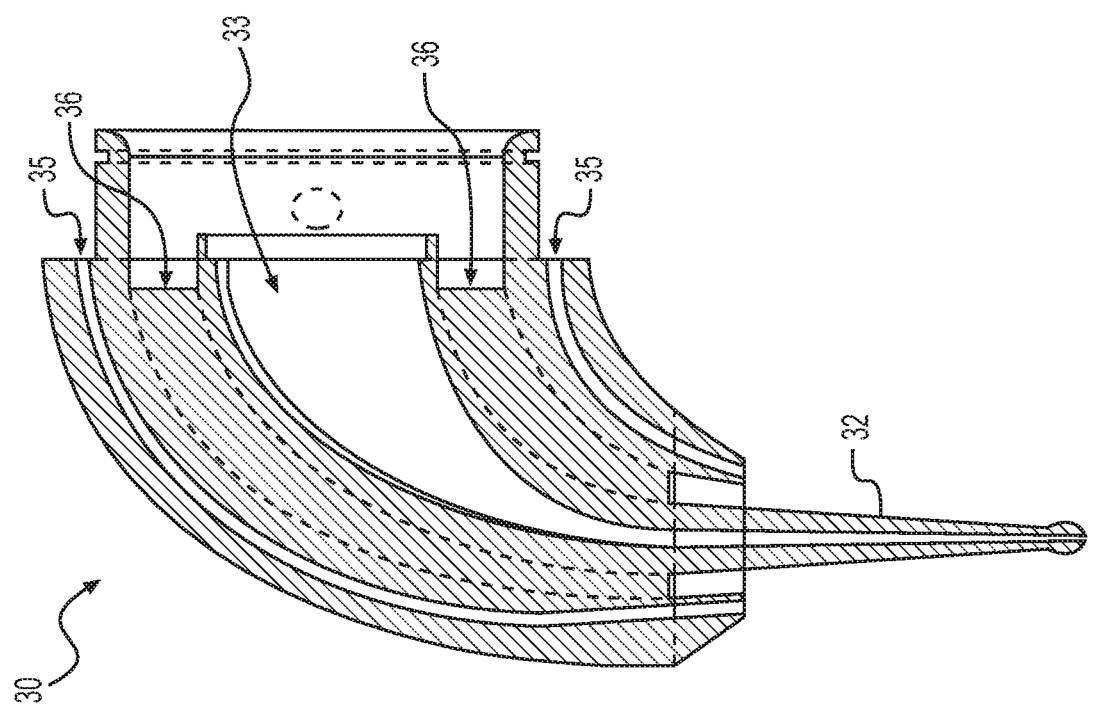
FIG. 9B
FIG. 9A

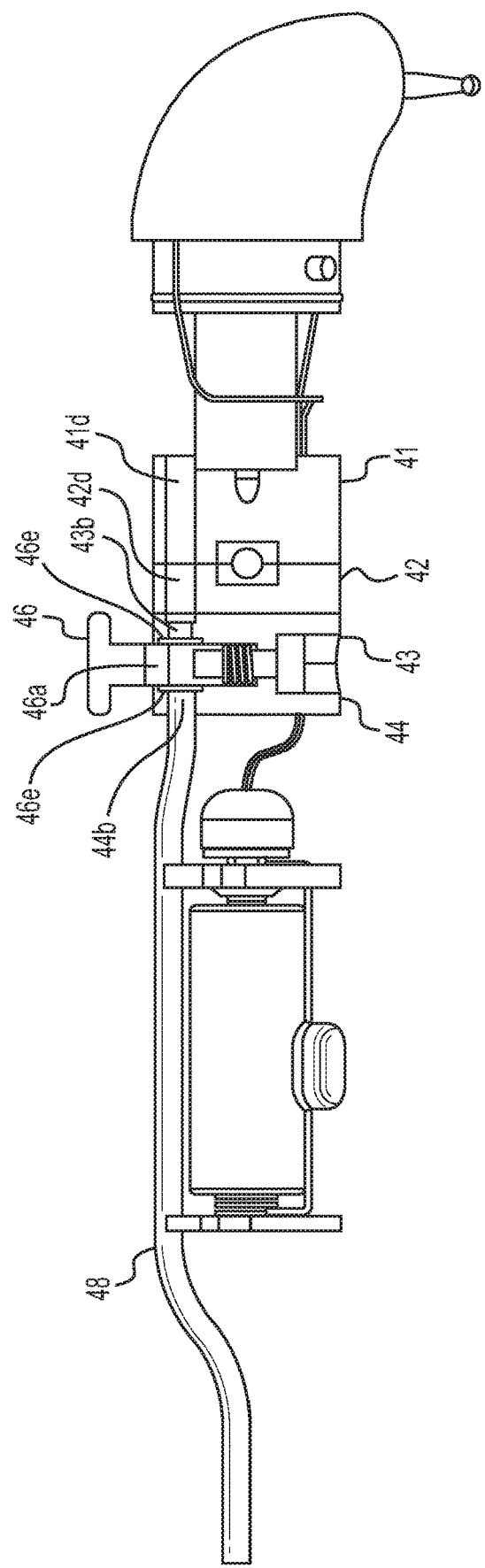

US 10,959,809 B1

MULTIFUNCTIONAL DENTAL LINER APPLICATOR

BACKGROUND

1. Field

The present disclosure relates to dental liner applicators, and in particular, to a multifunctional dental liner applicator that easily dispenses a liner material to the dental cavity and produces a stream of air for drying and provides light to the working area.

2. Description of the Related Art

Liner applicator instruments, commonly known as dycal applicators, are dental restorative (filling) instrument. The applicators are used to apply a thin viscous material, such as calcium hydroxide (Dycal), mineral trioxide aggregate (MTA), or glass ionomer cements, to deep tooth preparation areas in the axial wall and floor of the tooth. These deep areas are usually very close to the dental pulp which consists of the tooth nerves and blood supply. This procedure is called indirect pulp capping when the pulp is not exposed and direct pulp capping when there is small pinpoint pulp exposure. Indirect pulp capping protects the pulp from external stimulus, while direct pulp capping covers exposed pulp tissue to minimize or prevent the need for future root canal treatment.

Presently, multiple tools are required to perform a direct or indirect pulp capping procedure. For example, the practitioner must first measure the depth of the void in the prepared tooth using a measuring instrument to determine if the procedure will be a direct or indirect capping, which will determine which type of liner will be used. Then, using a drying instrument, the practitioner must dry the area receiving the liner to ensure the liner will properly adhere and so that the risk of infection is minimized. Lastly, the practitioner will apply the dental liner to the tooth using a liner applicator that is commonly too bulky or has too short of a working end to properly reach teeth in the back of the mouth. Switching between multiple tools increases the cost and duration of the procedure, while also increasing the risk of exposing the tooth to bacteria.

Thus, a dental liner applicator solving the aforementioned problems is desired.

SUMMARY

A multifunctional dental liner applicator dispenses tooth liner and a stream of air while illuminating the working dental area. The applicator includes a body and a head that is removably attached to a distal end of the body. The head supports a nozzle that is configured to be inserted into a void of a prepared tooth. A liner button on the body controls a valve for dispensing liner out of the nozzle. An air button controls airflow out of openings adjacent the nozzle for drying an area that is receiving liner. Fiber optic fibers extend from a button controlled light source housed in the body to openings adjacent the nozzle for illuminating the working area.

These and other features of the present disclosure will become readily apparent upon further review of the following specification and drawings.

BRIEF DESCRIPTION OF THE DRAWINGS

FIG. 3A is a proximal, perspective view of an embodiment of a distal liner valve body.

FIG. 3B is a distal, perspective view of the distal liner valve body of FIG. 3A.

FIG. 3C is a sectional view of the distal liner valve body of FIG. 3B, the cross-section taken along line 3C shown in FIG. 3B.

FIG. 4A is a distal, perspective view of an embodiment of a proximal liner valve body.

FIG. 4B is a sectional view of the proximal liner valve body of FIG. 4A, the cross-section taken at line 41 shown in FIG. 4A.

FIG. 5A is a proximal, perspective view of an embodiment of a distal air valve body.

FIG. 5B is a sectional view of the distal air valve body of FIG. 5A, the cross-section taken at line 5B shown in FIG. 5A.

FIG. 7A is a perspective view of an embodiment of a valve button.

FIG. 7B is a sectional view of the valve button of FIG. 7A, the cross-section taken at line 7B shown in FIG. 7A.

FIG. 9A is a sectional view of an embodiment of the head taken along a midline.

FIG. 9B is a sectional view of the head of FIG. 9A, the cross-section taken at line 9B shown in FIG. 9A.

FIG. 11A is a perspective view of an embodiment of the applicator with the body removed and the valve assembly cross-sectioned at a midpoint of the air button, in FIG. 10A the air button is in a closed position.

Similar reference characters denote corresponding features consistently throughout the attached drawings.

DETAILED DESCRIPTION OF THE PREFERRED EMBODIMENTS

The present subject matter relates to a multifunctional dental liner applicator that dispenses tooth liner and a stream of air while illuminating the working area. The applicator includes a body and head that is removably attachable to a distal end of the body. The head supports a nozzle that extends transversely to a length of the body and is sized and shaped to be inserted into a void of a prepared tooth. A liner button on the body controls a valve for dispensing liner out of the nozzle. An air button controls airflow out of openings adjacent the nozzle for drying an area that is receiving liner. Fiber optic fibers extend from a button controlled light source housed in the body to openings adjacent the nozzle for illuminating the working area.

Figure 1:
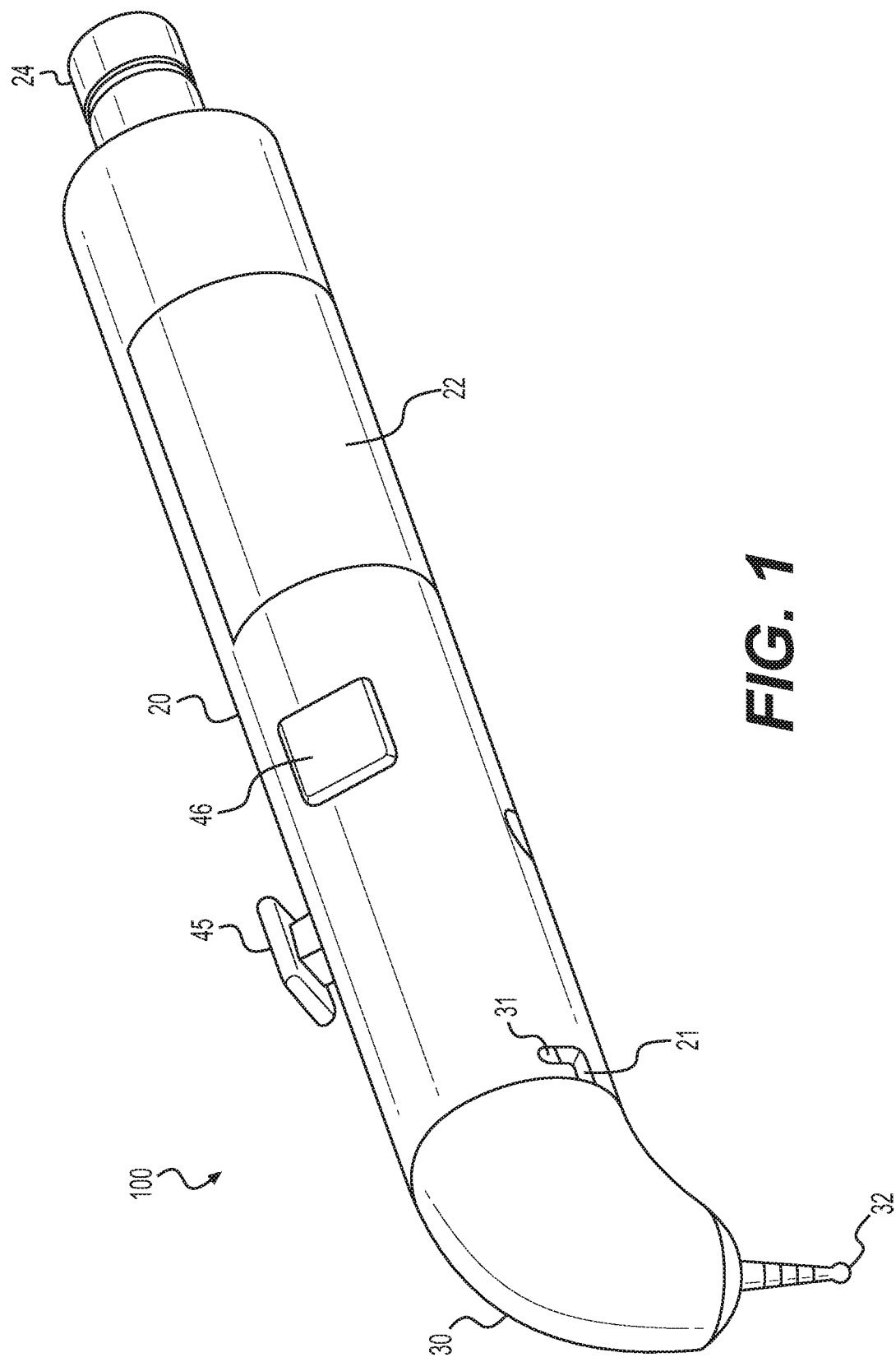
FIG. 1 is a perspective view of an embodiment of the applicator.

FIG. 1 shows an embodiment of the multifunctional dental liner applicator 100 in an assembled state. The applicator 100 may include a cylindrical body 20 having a proximal end supporting a pressurized air port 24 and a distal end supporting a head 30. The head 30 may be removably attachable to the body 20 using any means known in the art. For example, as shown in FIG. 1, the head 30 may include outwardly extending pegs 21 that fit into L-shaped slots 31 defined in the housing 20. An air button 46 and liner button 45 may extend from an outer surface of the body 20 for controlling the flow of air and liner out of the applicator 10.

Figure 2A:
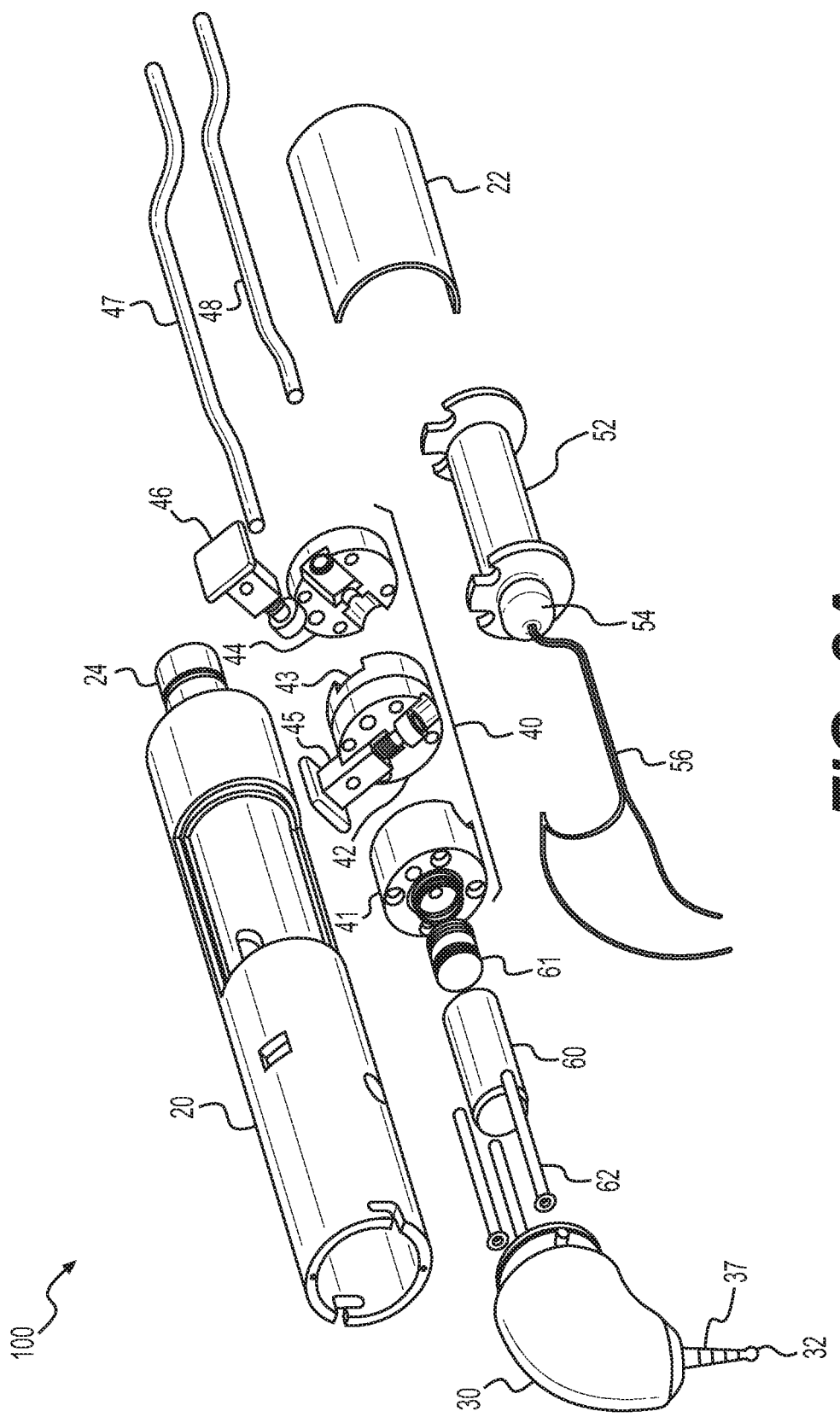
FIG. 2A is an exploded, perspective view of the applicator shown in FIG. 1.

FIG. 2A is an exploded view of the applicator 100 which shows the internal components housed within the housing 20. As shown in FIG. 2A, optical fibers 56 may extend through the body 20 and head 30. A battery cover 22 may be removably attachable to the body 20 for accessing a battery 52 that powers a light source 54. The light source 54 is connected to the optical fibers 56 for illuminating the area around the nozzle 32. In some embodiments, the body 20 may include an external charging port for charging the battery 52.

A valve assembly 40 controls the flow of liner and air out of the head 30. Two air lines 47, 48 provide air pressure to the valve assembly 40 which then uses the pressure through opening the valves, to dispense the liner and air. The first air line 47 may provide pressure to dispense liner by pushing a piston 61 through a reservoir 60 filled with liner. The liner then flows to a tip of the nozzle 32 through nozzle lumen 33 of the head 30. The piston 61 is exposed to air pressure when the liner button 45 is pushed into its valve body 41,42, thus opening up a pathway between the first air line 47 and the piston 61.

The second air line 48 may be connected to the air valve 43, 44 for dispensing air from the head 30 to a working area surrounding the tip of the nozzle 32. Pressing the air button 46 into the valve body 43,44 may open a pathway between the second air line 48 and are air lumen 36 extending through the head 30 that have outlets adjacent the nozzle 32. Two fiber optic fibers 56 may extend from the light source 54 and through fiber lumens in the head 30 to provide light in the area adjacent the nozzle 32. The light source 54 may be controlled by a button 58 (shown in FIG. 1A) which regulates the flow of electricity between the battery 52 and the light source 54.

Figure 2B:
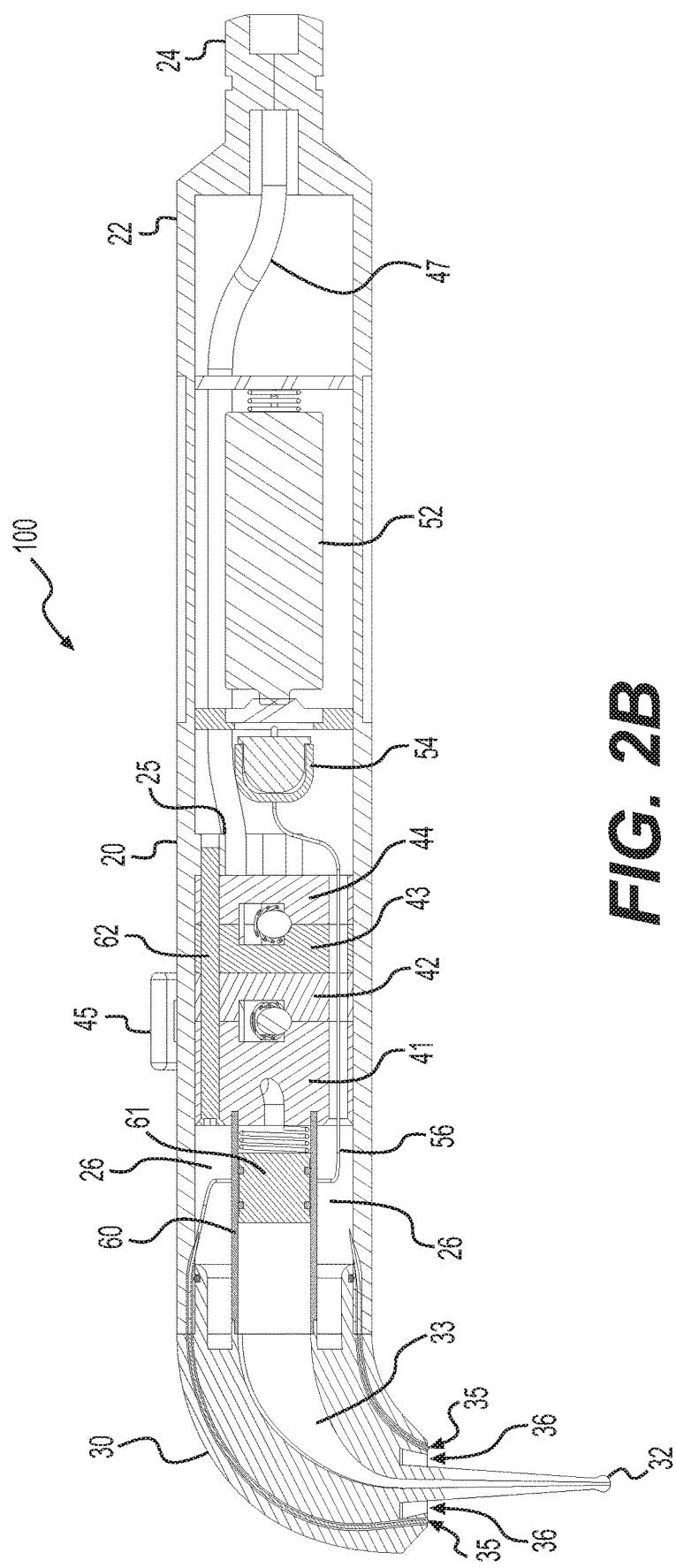
FIG. 2B is a sectional view of the applicator of FIG. 1 taken at its midline.

FIG. 2B is a cross-section of the applicator 10 showing the relation between the internal components when the applicator 10 is in an assembled state. The nozzle lumen 33, which guides liner to the tip of the nozzle 32 may extend through a center of the head. Fiber lumens 35, which hold the optical fibers 56, may extend through the head 30 on opposing sides of the nozzle lumen 33. A distal outlet of the liner reservoir 60 leads directly into the nozzle lumen 33 for dispensing liner into the nozzle lumen 33 and out of the nozzle 32. The chamber 26 surrounding the liner reservoir 60 provides a pathway for air exiting the distal end of the valve assembly 40 to reach the air lumens 36 of the head 30. A proximal inlet of the liner reservoir 60 is connected to the air outlet of the valve assembly 40 regulated by the liner button 45. The first air line 47 extends from the proximal air port 24 to the valve assembly 40. The valve assembly 40 may be connected to the body 20 by a bolt 62 extending through the assembly 40 that screws into a threaded protrusion 25 on an inside of the assembly body 20. The battery 52 and light source 54 may be located proximal to the valve assembly 40 and transmit light to the head 30 though the optical fibers 56.

The nozzle 32 may extend down in a direct transverse to a length of the body 20 for reaching teeth in a back of a patient's mouth. A measuring scale 37 (shown in FIGS. 1 and 2A) may be provided along a length of the nozzle 32 to assist a user to measure a depth of the void in a prepared tooth. A tip of the nozzle 32 may define a spherical, blunt tip. The spherical tip may prevent damage to the tooth when the depth of the cavity is being measured. In addition, the blunt tip may assist in evenly spreading the dental liner around the tooth.

FIGS. 3A-3C show an embodiment of the distal liner valve body 41. Four bolt holes 41c and one air hole 41d may be defined through the valve body 41. A channel 41a may be defined in the proximal surface of the valve body 41 for accepting a portion of the liner button 45. A guide 41g may be formed in the channel 41a to retain a shaft 45c of the liner button 45. As shown in FIGS. 4A-4C, the outlet hole 41b may extend through the body 41 near a proximal edge thereof, to align with the opening 45b in the liner button 45 and the reservoir 60. A channel 41e may surround the proximal end of the outlet 41b for supporting an O-ring 45e (shown in FIGS. 10A-10B) which may be used to create an air tight seal between the liner button 45 and the valve body 41. A channel 41f may surround the distal end of the outlet 41b for supporting a piston spring 63.

FIGS. 4A and 4B show an embodiment of the proximal liner valve body 42. Four bolt holes 42c and one air hole 42d may be defined through the body 42. A channel 42a may be defined in the distal surface of the body 42 for accepting a portion of the liner button 45. A guide 42g may be formed in the channel 42a to retain a shaft 45c of the liner button 45. An inlet hole 42b located within the channel 42a, may extend through the valve body 42 to align with a hole 45a in the liner button 45 when the button 45 is pressed into an open position. A counterbore may surround the distal end of the inlet hole 42b for supporting an O-ring 45e which may be used to create an air tight seal between the liner button 45 and the valve body 42.

FIGS. 5A and 5B show an embodiment of the distal air valve body 43. Four bolt holes 43c and one air hole 43d may be defined through the valve body 43. A channel 43a may be defined in the proximal surface of the valve body 43 for accepting a portion of the air button 46. A guide 43g may be formed in the channel 43a to retain a shaft 46c of the air button 46. An outlet hole 43b, located in the channel 43a, may extend through the valve body 43 to align with a hole 46a in the air button 46 when the button 46 is pressed in to an open position. A channel 43e, defined at the proximal end of the outlet hole 43b, can support an O-ring 46e (shown in FIGS. 11A-11B) which may be used to create an air tight seal between the air button 46 and the valve body 43. A counterbore may surround the distal end of the outlet hole 43b for supporting an O-ring which may be used to create an air tight seal between the proximal liner valve body 42 and the distal air valve body 43.

Figure 6B:
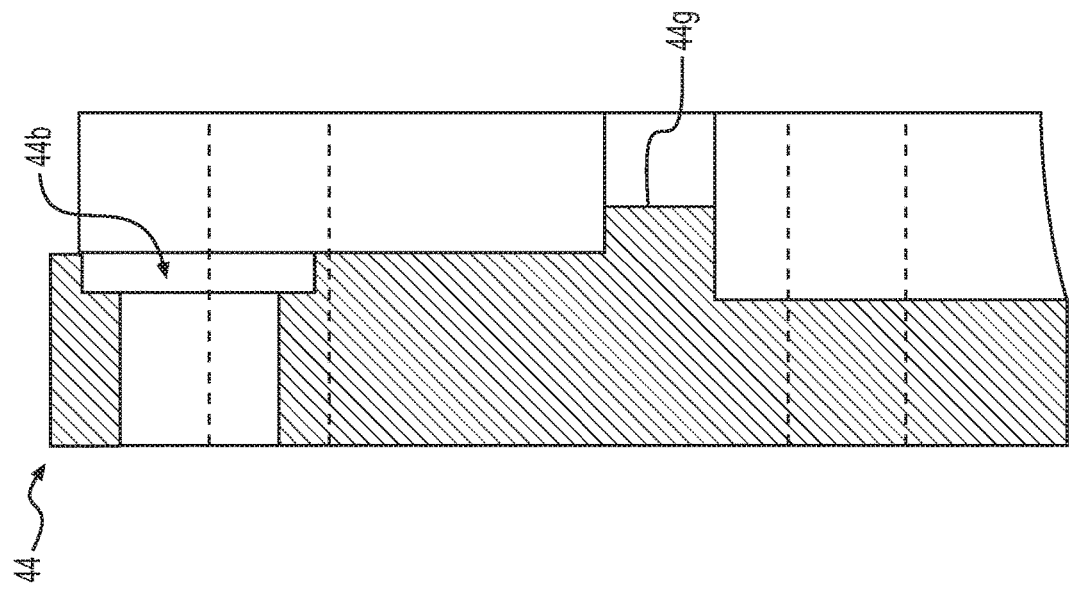
FIG. 6B is a sectional view of the proximal air valve body of FIG. 6A, the cross-section taken at line 6B shown in FIG. 6A.
Figure 6A:
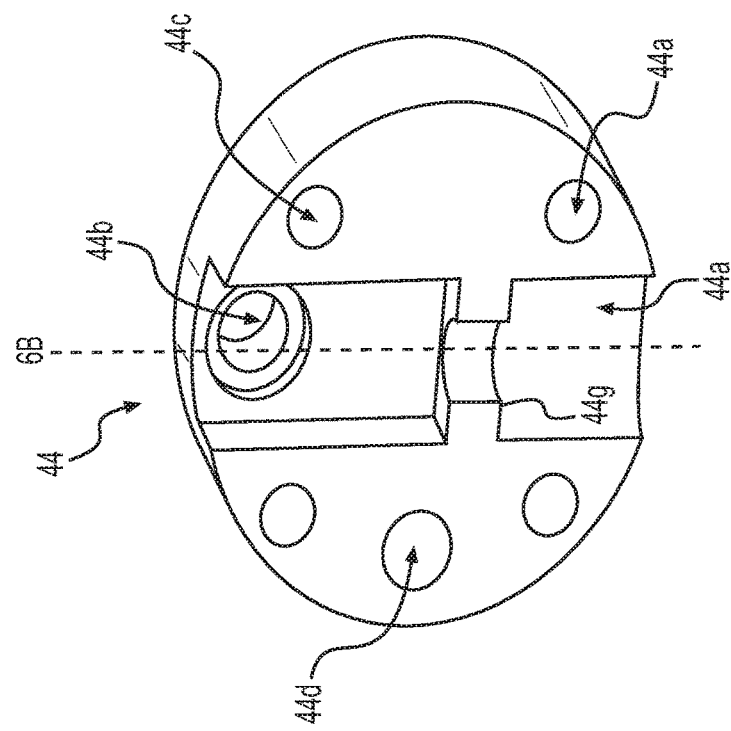
FIG. 6A is a distal, perspective view of an embodiment of a proximal air valve body.

FIGS. 6A and 6B show an embodiment of the proximal air valve body 44. Four bolt holes 44c and one air hole 44d may be defined through the valve body 44. A channel 44a may be defined within the distal surface of the valve body 44 for accepting the air button 46. A guide 44g may be formed in the channel 44a to retain a shaft 46c of the air button 46. An inlet hole 44b, located within the channel 44a, may extend through the valve body 44 to align with a hole 46a in the air button 46 when the button 46 is pressed into an open position. A counterbore may surround the distal end of the inlet hole 46b for supporting an O-ring 46e which may be used to create an air tight seal between the air button 46 and the valve body 44.

FIGS. 7A and 7B shows an embodiment of a liner button 45 which may be similar to the air button 46. The button 45 may include a body 45b having a proximal face and a distal face, and an opening 45a extend from the proximal face to the distal face. The proximal and distal faces may be planar for creating an air tight seal between the button 45 and the O-rings 45e. A guide shaft 45c may extend from the body 45b and form an outwardly extending flange at its lower end. A length of the guide shaft 45c may define a range of motion for the button 45. A spring 45d may wrap around the guide shaft 45c for biasing the button 45 towards a closed position. In an assembled state, the spring 45d may push against a guide 41g wrapped around the guide shaft 45c. An outwardly extending flange may extend out from a top of the body 42 to provide a large surface for a user to push on the top of the button 45.

Figure 8:
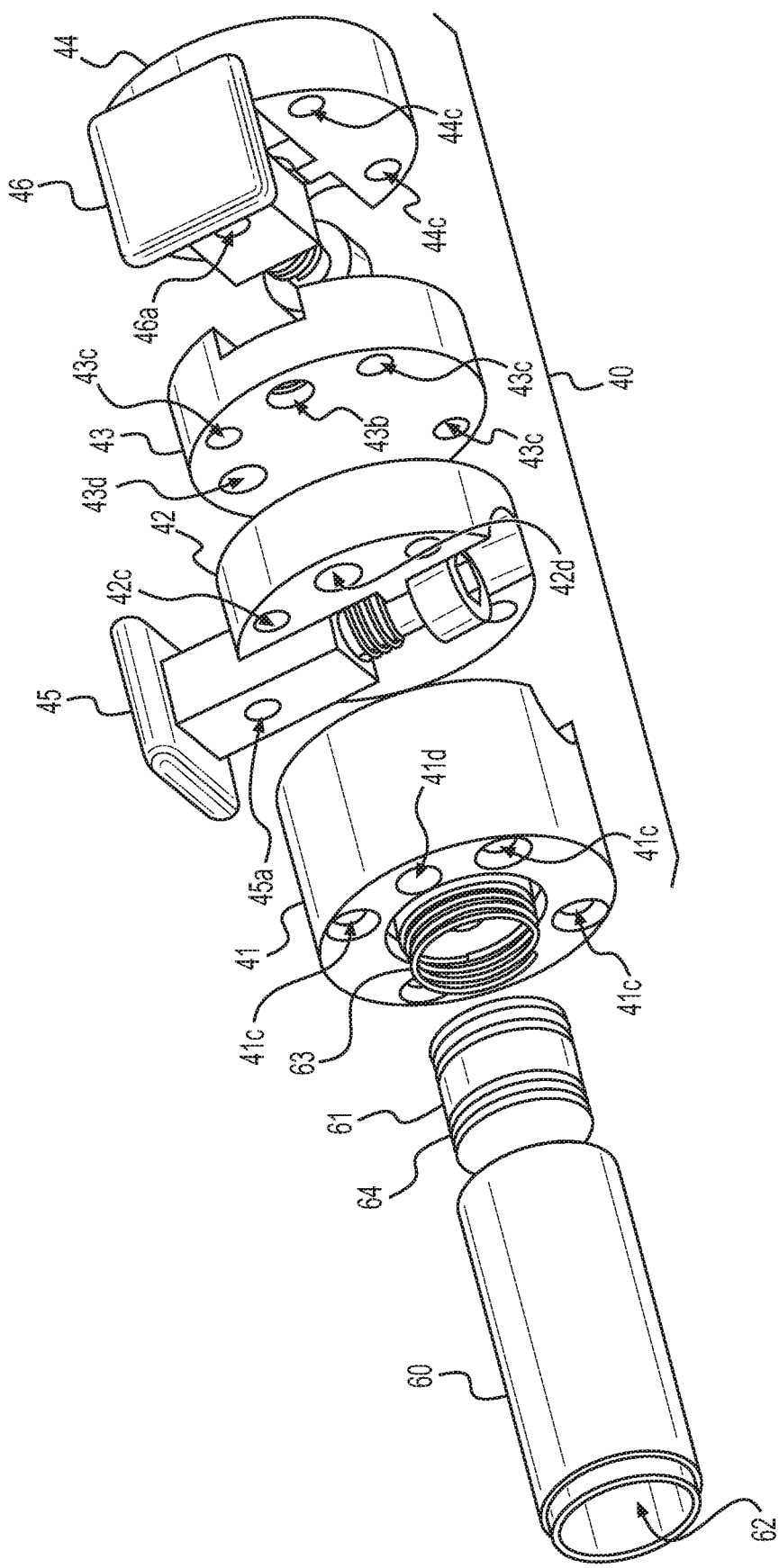
FIG. 8 is an exploded, perspective view of an embodiment of the valve assembly, piston, and reservoir.

FIG. 8 shows an exploded view of the valve assembly 40, as well as the piston 61, piston spring 63, and liner reservoir 60. The air button 46 may be retained between proximal air valve body 43 and distal air valve body 44. Each air valve body 43, 44 may define a respective channel 43a, 44a which accepts the air button 46 and allows for the button 46 to move in and out of the valve body 43, 44. A spring 46d may bias the air button 46 to a closed position extending out of the valve body. An air inlet hole 44b of the proximal air valve body 44 may align with an air outlet hole 43b of the distal air valve body 43. When the air button 46 is in a closed position, an opening 46a in the air button 46 may not be aligned with the air inlet 44b or air outlet 43b holes, thus closing a pathway for air to flow through the valve 44. When the air button 46 is pressed into the body, the opening 46a in the air button 46 may align with the air inlet 44b and air outlet 42b to provide a pathway for the pressurized air at the inlet 44b to flow through the valve to the outlet 43b. The air outlet 43b may align with air openings 41d, 42d in the proximal and distal liner valve bodies 42, 41 to provide a pathway for the pressurized air to reach the chamber 26 in the distal end of the body 20. Aligned air holes 43d, 44d may extend through the proximal and distal air valve bodies 43, 44 to create a passageway for providing pressurized air to the liner valve.

The liner button 45 may be retained between proximal and distal liner valve bodies 41, 42. The liner button 45 may sit within channels 41a, 42a defined by the proximal and distal liner valve bodies 41, 42. A spring 45d may bias the button 45 to an outward, closed position. The proximal liner valve body 42 may define an inlet opening 42b and the distal liner valve body 41 defines an outlet opening 41b. In a closed position, when the liner button 45 is extending out from the body 41, 42, the inlet and outlet 42b, 41b of the liner valve bodies 42, 41 may be sealed by a body 45b of the button 45. When the button 45 is pressed into the valve bodies 41, 42, an opening in the valve 45a may align with the inlet 42b and outlet 41b to allow for pressurized air to flow through the valve for moving the piston 61 through the liner reservoir 60. Each of the proximal liner valve body 42, distal liner valve body 41, proximal air valve body 44, and distal air valve body 43 may define multiple bolt holes 41c, 42c, 43c, 44c, which may be aligned when the valve assembly 40 is in an assembled state, to receive bolts 62 that hold the assembly together, as well as attaches the valve assembly 40 to the body 20.

The reservoir 60 may be seated against the distal air valve body 41 and surround a distal end of the outlet 41b. A piston 61 may reside within a bore 62 of the reservoir 60 and may be able to slide along a length of the bore 62. A spring 63 may be located between the piston 61 and the distal air valve body 41 to ensure rings 64 of the piston 61 are seated within the bore 62 for maintaining an air tight seal between the piston 61 and the bore 62.

FIGS. 9A and 9B show an embodiment of a head 30 of the dispenser 10. Nozzle lumen 33 may extends through the center of the head 30 and the nozzle 32. A proximal end of the nozzle lumen 33 may define a counterbore to accept, and create a fluid tight seal against, the distal end of the reservoir 60 when the head 30 is attached to the body 20. Optical fiber lumens 35 may extend through the head 30 on the proximal and distal sides of the nozzle lumen 33 for housing the optical fibers 56. Air channels 36 may be formed through the head 30 on opposing side of the nozzle lumen 33 to provide a pathway for pressurized air to travel out of the chamber 26 in the body 20 to a site being dried by a user.

Figure 10A:
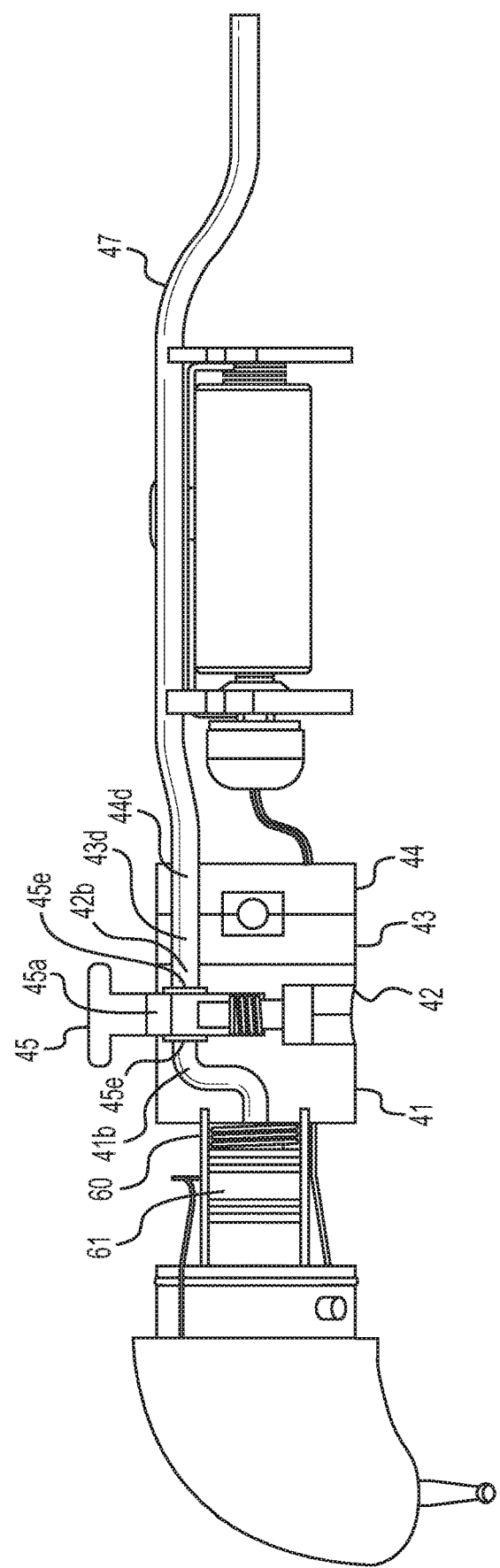
FIG. 10A is a perspective view of an embodiment of the applicator with the body removed and the valve assembly cross-sectioned at a midpoint of the liner button, in FIG. 10A the liner button is in a closed position.
Figure 10B:
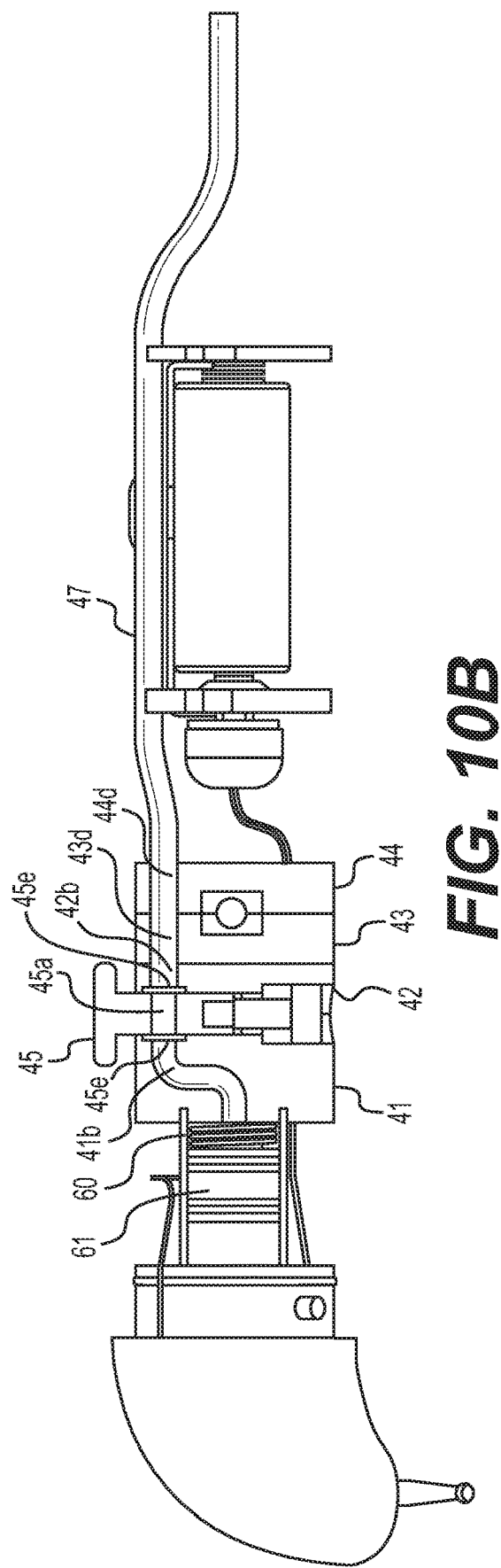
FIG. 10B is a perspective view of an embodiment of the applicator with the body removed and the valve assembly cross-sectioned at a midpoint of the liner button, in FIG. 10A the liner button is in an open position.

FIGS. 10A and 10B show an embodiment of the dispenser 100 with the body 20 removed and the valve assembly 40 cross-sectioned through a center of the liner button 45 for visualizing the functionality of the liner valve 41, 42, 44. In FIG. 10A, the liner button 45 is in a resting position caused by the spring 46d biasing the button 45 upwards. In the resting position, the inlet hole 42b and outlet hole 41b may be sealed against the side surfaces of the liner button 45 by O-rings 45e to prevent air from flowing through the valve 41, 42, 44. When the liner button 45 is pressed down, as shown in FIG. 10B, the opening 45a creates an open pathway between the inlet 42b and the outlet 41b, thus opening the valve 41, 42, 44 and allowing air from the air tube 47 to push the piston 61 forward to dispense liner.

Figure 11B:
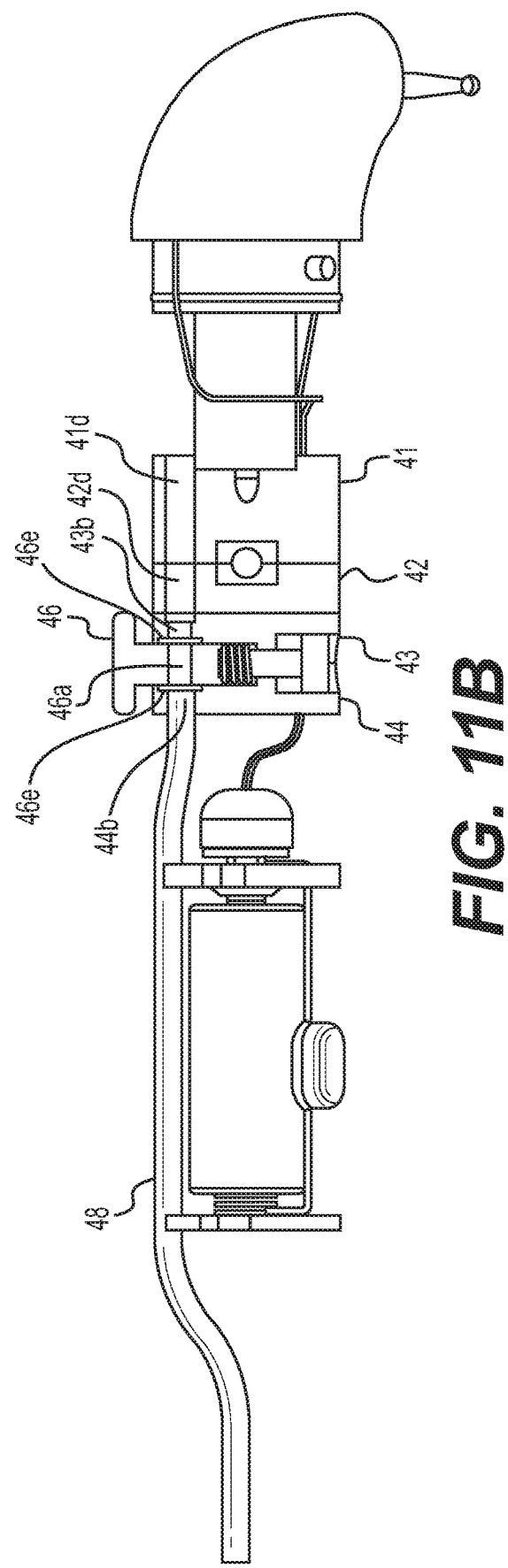
FIG. 11B is a perspective view of an embodiment of the applicator with the body removed and the valve assembly cross-sectioned at a midpoint of the air button, in FIG. 10A the air button is in an open position.

FIGS. 11A and 11B show an embodiment of the dispenser 100 with the body 20 removed and the valve assembly 40 cross-sectioned through a center of the air button 46. In FIG. 11A, the air button 46 is in a resting position caused by the spring 46d biasing the button 46 upwards. In the resting position, the inlet hole 44b and outlet hole 43b are sealed against the side surface of the air button 46 and no air is allowed through the valve 43, 44, 46. When the air button 46 is pressed down, as shown in FIG. 11B, the opening 46a creates an open pathway between the inlet 44b and the outlet 43b, thus opening the valve 43, 44, 46 and allowing air from the air tube to push the piston 61 forward to dispense liner.

It is to be understood that the multifunctional dental liner applicator is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:
1. A multifunction dental liner applicator, comprising:
   a valve assembly, comprising:
      an air valve configured to selectively release pressurized air, the air valve includes:
         a distal air valve body defining a channel and an outlet lumen opening into the channel;
         a proximal air valve body defining a channel and an inlet lumen opening into the channel; and
         an air button defining a first lumen, the air button positioned in the channel of the proximal air valve body and the channel of the distal air valve body, whereby pressing the air button aligns the first lumen with the inlet lumen and outlet lumen to allow airflow through the air valve and releasing the air button causes opposing surfaces of the air button to seal the inlet lumen and outlet lumen;

a liner valve configured to selectively release pressurized air, the liner valve defines an opening that aligns with the outlet lumen of the air valve for passing air through the liner valve;

a pressurized air port in fluid communication with the air valve through a first tube and in fluid communication with liner valve through a second tube;

a reservoir including a bore in fluid communication with an outlet of the liner valve;

a piston disposed within the bore, the piston configured to slide along a length of the bore;

a nozzle providing a nozzle lumen in fluid communication with the reservoir, wherein advancing the piston through the reservoir forces matter within the reservoir through the nozzle;

an air channel, the air channel leading from an outlet of the air valve to an opening adjacent the nozzle;

a light source; and at least one optical fiber extending from the light source to the nozzle.

2. The multifunctional dental liner applicator of claim 1, wherein the liner valve comprises:

a distal liner valve body defining a channel and an outlet lumen opening into the channel;

a proximal liner valve body defining a channel and an inlet lumen opening into the channel; and a liner button defining a second lumen, the liner button being positioned in the channel of the proximal liner valve body and the channel of the distal liner valve body, whereby pressing the liner button aligns the second lumen with the inlet lumen and outlet lumen to allow airflow through the liner valve, and releasing the liner button causes opposing surfaces of the liner button to seal the inlet lumen and outlet lumen.

3. The multifunctional dental liner applicator of claim 2, wherein the air valve defines an opening that aligns with the inlet lumen of the liner valve for passing air through the air valve.

4. The multifunctional dental liner applicator of claim 2, wherein an outlet lumen of the liner valve opens directly into the bore of the reservoir for pushing the piston with air pressure.

5. The multifunction dental liner applicator of claim 1, further comprising a head, the nozzle extending out from the head, the nozzle lumen extending through the head and the nozzle, the air channel and at least one optical fiber extending through the head.

6. The multifunctional dental liner applicator of claim 1, wherein a measuring scale comprising indicators at equally spaced increments is provided along a length of the nozzle.

7. The multifunctional dental liner applicator of claim 1, wherein the nozzle forms a bulbous shaped tip.

8. A multifunction dental liner applicator, comprising:

a tubular body defining an inner chamber, the tubular body having a proximal end, a distal end, and a length defined between the proximal end and distal end;

a pressurized airport connected to the distal end of the body;

a head removably attached to the proximal end of the body, the head defining a nozzle extending transverse to the length of the body;

a liner valve, the liner valve comprising a channel having an inlet and outlet lumen and configured to receive pressurized air from the air port and dispense the dental liner from the nozzle using the pressurized air when a liner button is actuated;

an air valve, the air valve includes an opening that aligns with the inlet lumen of the liner valve for passing air through the air valve to receive pressurized air from the air port and dispense a stream of air from the head when an air button is actuated;

a light source positioned in the body; and at least one optical fiber extending from the light source to an opening in the head adjacent the nozzle.

9. The multifunctional dental liner applicator of claim 8, further comprising a cylinder defining a bore and a piston within the bore, the air valve configured to push the piston through the bore using air pressure.

10. The multifunctional dental liner applicator of claim 8, wherein the head includes a nozzle lumen, at least one air lumen, and at least one optical fiber lumen.

* * * * *